United States Patent
Bailey et al.

(10) Patent No.: US 7,860,228 B1
(45) Date of Patent: Dec. 28, 2010

(54) SYSTEM AND METHOD FOR PROVISIONING TELEPHONY SERVICES

(75) Inventors: William Bailey, Phoenix, AZ (US); Jeffrey Scott Fehlhaber, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1076 days.

(21) Appl. No.: 10/905,004

(22) Filed: Dec. 9, 2004

Related U.S. Application Data

(60) Provisional application No. 60/557,013, filed on Mar. 25, 2004.

(51) Int. Cl.
*H04M 3/42* (2006.01)
(52) U.S. Cl. ............... 379/201.12; 379/114.1; 379/114.12; 379/114.13; 705/14.1
(58) Field of Classification Search ............ 379/114.04, 379/114.1, 126, 127.05, 210.03, 201.12, 379/114.12, 114.13; 705/14.1
See application file for complete search history.

(56) References Cited

U.S. PATENT DOCUMENTS

| 5,491,742 | A |   | 2/1996  | Harper et al. |
|-----------|---|---|---------|---------------|
| 5,629,978 | A |   | 5/1997  | Blumhardt et al. |
| 5,917,817 | A |   | 6/1999  | Dunn et al. |
| 6,031,904 | A |   | 2/2000  | An et al. |
| 6,041,325 | A | * | 3/2000  | Shah et al. ............... 707/10 |
| 6,091,808 | A | * | 7/2000  | Wood et al. ............ 379/201.04 |
| 6,144,644 | A |   | 11/2000 | Bajzath et al. |
| 6,161,128 | A |   | 12/2000 | Smyk |
| 6,278,704 | B1 |  | 8/2001  | Creamer et al. |
| 6,282,281 | B1 |  | 8/2001  | Low |
| 6,337,899 | B1 |  | 1/2002  | Alcendor et al. |
| 6,341,353 | B1 | * | 1/2002  | Herman et al. ............... 726/5 |
| 6,343,119 | B1 |  | 1/2002  | Creamer et al. |
| 6,356,543 | B2 |  | 3/2002  | Hall et al. |
| 6,377,993 | B1 |  | 4/2002  | Brandt et al. |
| 6,381,320 | B1 |  | 4/2002  | Creamer et al. |
| 6,421,727 | B1 |  | 7/2002  | Reifer et al. |
| 6,445,694 | B1 |  | 9/2002  | Swartz |
| 6,480,890 | B1 | * | 11/2002 | Lee et al. ............... 709/223 |
| 6,519,252 | B2 |  | 2/2003  | Sallberg |
| 6,574,661 | B1 |  | 6/2003  | Delano et al. |
| 6,611,498 | B1 |  | 8/2003  | Baker et al. |
| 6,631,186 | B1 |  | 10/2003 | Adams et al. |
| 6,661,779 | B2 |  | 12/2003 | Johnson, Jr. et al. |
| 6,697,357 | B2 |  | 2/2004  | Emerson, III |
| 6,714,637 | B1 |  | 3/2004  | Kredo |
| 7,337,220 | B2 | * | 2/2008  | Kortum et al. ............... 709/223 |

(Continued)

OTHER PUBLICATIONS

"Breakthrough Improvements in Telco Provisioning", by Kirby, et al., in Adventis Flashpoint, 2001 (8 pages).

(Continued)

*Primary Examiner*—Ahmad F Matar
*Assistant Examiner*—Antim Shah
(74) *Attorney, Agent, or Firm*—Snell & Wlimer L.L.P.

(57) ABSTRACT

The invention includes telephony servicing over a computerized network wherein customers of a telephony services company may establish basic services, add new services or modify existing services. A customer may create an account on a provisioning system and manage the account options within a provisioning system which facilitates activity within an existing carrier provisioning system architecture.

19 Claims, 4 Drawing Sheets

U.S. PATENT DOCUMENTS

| | | | |
|---|---|---|---|
| 7,650,304 B1 * | 1/2010 | Metsker et al. | 705/37 |
| 2001/0038689 A1 | 11/2001 | Liljestrand et al. | |
| 2002/0029276 A1 * | 3/2002 | Bendinelli et al. | 709/227 |
| 2002/0076003 A1 | 6/2002 | Zellner et al. | |
| 2002/0199182 A1 * | 12/2002 | Whitehead | 725/1 |
| 2003/0053444 A1 | 3/2003 | Swartz | |
| 2003/0228011 A1 * | 12/2003 | Gibson | 379/211.02 |
| 2004/0013109 A1 | 1/2004 | Vaananen et al. | |
| 2004/0137897 A1 * | 7/2004 | Teixeira | 455/423 |
| 2004/0176997 A1 * | 9/2004 | Podgurny et al. | 705/14 |

OTHER PUBLICATIONS

White Paper entitled "Automated Service Provisioning and Management", by Ennovate Networks, Inc., 1999 (12 pages).

* cited by examiner

SYSTEM AND METHOD FOR PROVISIONING TELEPHONY SERVICES

CROSS-REFERENCE TO RELATED APPLICATIONS

This application claims priority to, and the benefit of, U.S. Provisional Application Ser. No. 60/557,013 filed Mar. 25, 2004 and entitled "System and Method for Telephony Servicing", which is hereby incorporated by reference.

FIELD OF INVENTION

The present invention relates generally to online management and delivery of telephony services to customers of voice and/or data carriers, and more particularly to a system and method for provisioning telecommunications services and providing carrier customers substantially real-time access to their carrier account to view and/or modify service selections.

BACKGROUND OF INVENTION

The U.S. Government breakup of AT&T in 1984 led to a number of smaller companies competing for the telecommunications market. Competition has become intense in the industry and telemarketing became an important marketing tool employed by many carriers in an effort to persuade customers to drop their current carrier and sign up with them. With many customers changing carriers and services, efficiency and cost effective telephony provisioning systems have become increasingly important to the profitability of a telecommunications company. As sophisticated as telephony provisioning systems are on the back end, there remain some marked disadvantages and problems to the front end procedures of the services provisioning process.

Telephony service provisioning has changed rapidly in recent years with more powerful computing systems and advances in electronic data storage. In its very basic form, telephone service provisioning comprises installing live telephone wiring leading from a relay to a structure and assigning a unique telephone number which corresponds with the relay. However, installation of basic telephone services serves as a base to a host of other services made available to customers such as, for example, voice messaging, long distance service, call forwarding, conference calling, distinctive ring, caller ID, call blocking, etc.

In many cases, a customer service request is needed to initiate the provisioning process, but the back end process is largely if not entirely computerized. Depending on the nature of the service request, some manual work or testing may be needed; however, many services may be activated, configured and deactivated through computerized processes. Therefore, while many of the provisioning activities are computerized, the current model for service provisioning still depends on human interaction in the front end to initiate the computerized provisioning transactions.

Relying on human processes for service provisioning usually leads to an expensive, lengthy process which may include documentation and disclosure forms. Conventional servicing, including basic and advanced telephony account options, typically relies on verbal (e.g., human and voice response) and/or written communication. The provisioning process at present involves customers calling (or receiving a telemarketing call from) the telecommunications service provider and requesting a service. This request often generates a work order that is scheduled and acted upon by an engineer or a technician at a later date. Most of the billable features simply involve selecting an option on the customers' line and saving the new configuration via software because telephony networks and switching systems are typically software configurable. Moreover, telemarketing regulation enforcement mechanisms rely on maintaining a "Do Not Call" database which may also be part of a service request.

During the same timeframe as the increase in telephone services, customers have become more accustomed to transacting business over the Internet. Customers are increasingly using the Internet to purchase goods and services, conduct banking, view utility bills, order prescription drugs, and a number of other online offerings. A number of real and perceived advantages to conducting business online exist including, for example, the convenience of 24 hour service, cost savings, fast transactions, and a general feeling that the customer has a greater control over the transaction or account.

Therefore, a need exists for a service provisioning system which is accessible by customers via a network such as the Internet. A need also exists to reduce staffing requirements for customer service agents, thereby reducing costs and providing customers with a highly desirable means to purchase telephony services. In addition, telephony services are needed which do not require substantial human intervention and that may be activated in real-time. Automated provisioning of telephony services may also provide an additional revenue stream for a carrier, in that services managed through a website may be billed at a premium rate or may include a "convenience fee".

SUMMARY OF INVENTION

In general, the present invention overcomes the limitations and problems of the prior art by providing a system and method for facilitating the management of telephony servicing via the internet. More particularly, the invention facilitates management of communication services by providing an internet webpage to a customer via a customer browser; allowing a customer, via the webpage, to modify a communication service of a carrier system by creating a customer modification; and, transmitting the customer modification to the carrier system. The system includes an internet browser configured to facilitate communication between a customer and a provisioning system, wherein the provisioning system is configured to communicate information related to at least one of adding, changing and deleting a communication service to a carrier system.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
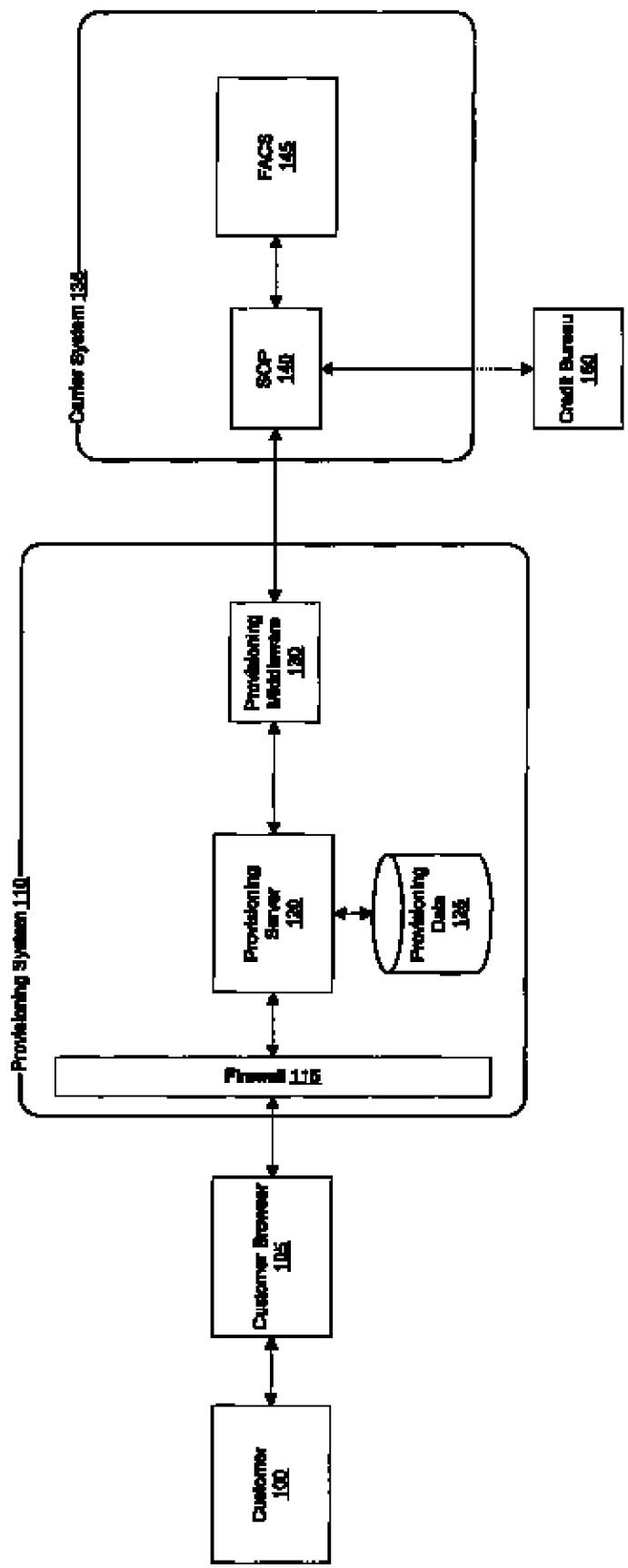
FIG. 1 is a block diagram illustrating the major system components for an exemplary telecommunication provisioning system.

In general, the invention includes a system and method for provisioning telecommunications services. With reference to FIG. 1, the invention enables a customer 100 to manage telecommunications services through a network (e.g., Internet) based application, such as a web browser 105. Management activities may include, for example, ordering basic telecommunications service, ordering additional services, terminating services, configuring services, configuring billing preferences, and the like. In one embodiment, the system also includes one or more provisioning system 110, carrier system 135 and credit system 150. Provisioning system 110 may include, in one embodiment, one or more firewall 115, provisioning server 120, provisioning data 125 and provisioning middleware 130.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

A service, as used herein, may include any feature offered by a carrier. The service may be provided by or to an individual, business, organization, government entity, software, hardware, and the like. The service may include goods or items of monetary value, but a value is not required. For example, the service may include voice messaging, long distance service, call forwarding, conference calling, distinctive ring, caller ID, online bill payment, account history, call history, call blocking or hardware such as, for example, a telephone or a caller ID unit that is issued in association with a caller ID service.

A carrier, as used herein, may include any individual, business, entity, government organization, software and/or hardware suitably configured to provide a service. The carrier may provide any service relating to data transmission including, for example, voice, data, electronic, optical, radio or other means for communication. The carrier may provide service to any entity in exchange for value, but value is not required. The carrier may be owned by or affiliated with an entity marketing telecommunications services, however this is not required. A carrier may include, for example, AT&T® phone system, Qwest® phone service, American Express® Membership Rewards® loyalty system, Cox® digital cable system, AOL® internet access system, or Dish Network® television system. While the invention may be described with respect to telephone services, one skilled in the art will appreciate that any services of various carriers may utilize the invention.

A customer 100, as used herein, may include any individual, business, entity, government organization, software and/or hardware suitably configured to participate in the invention. The customer 100 may have a previously established service relationship with a carrier or may be an entity interested in establishing a new relationship with a carrier. The customer 100 may interface with the system via any communication protocol, device or method discussed herein. In one embodiment, the customer 100 may interface with the system via an Internet browser. A customer browser 105 may comprise any hardware and/or software suitably configured to facilitate input, receipt and/or review of any information related to provisioning system 110 or any information discussed herein. The customer browser 105 may include any device (e.g., personal computer) which communicates (in any manner discussed herein) with the provisioning system 110 via any network discussed herein. Such browser applications comprise Internet browsing software installed within a computing unit or system to conduct online commerce transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that customer browser 105 may or may not be in direct contact with the provisioning system 110. For example, a customer browser 105 may access the services of a provisioning system 110 through another server which may have a direct or indirect connection to the provisioning system 110.

Provisioning server 120 may include any hardware and/or software suitably configured to facilitate management, ordering and/or canceling services. Provisioning server 120 may interface directly or indirectly with customer browser 105, provisioning middleware 130 and provisioning database 125. Provisioning server 120 may operate as a single entity in a single geographic location or as separate computing components located together or in separate geographic locations. Further, provisioning server 105 may be an Internet server or may send, receive and process data via a network both to and from a separate Internet server. Provisioning server 120 may be configured to dispatch requests to the components behind the firewall 115 which prevents direct access to provisioning system 110 components. Certain data transmissions from the customer browser 105 may pass through the firewall 115, and may be processed by the provisioning server 120 which stores data within a provisioning database or transmits data to the carrier system 135 through the provisioning middleware 130.

Provisioning database 125 may include any hardware and/or software suitably configured to facilitate storing customer 100 provisioning server account and/or carrier account information. Customer 100 information may include, for example, name of service customer (individual or business), service addresses, billing name, billing address, telephone numbers, email addresses, credit data, user ID and/or password, service status information, loyalty point information, and the like. For simplicity, the provisioning database 125 is illustrated and described herein as a single database. One skilled in the art will appreciate that the provisioning system 110 may employ any number of databases in any number of configurations. Further, as described in detail below, the provisioning database 125 may be any type of database, such as relational, hierarchical, object-oriented, and/or the like.

Provisioning middleware 130 may include any hardware and/or software suitably configured to facilitate communications and/or process transactions between disparate computing systems. Middleware components are commercially available and known in the art. The provisioning middleware 130 may be implemented through commercially available hardware and/or software, through custom hardware and/or software components, or through a combination thereof. Provisioning middleware 130 may reside in a variety of configurations and may exist as a standalone system or may be a software component residing within the provisioning server 120. The provisioning middleware 130 may send and receive data between the provisioning server 120 and the Service Order Processor (SOP) 140, which may comprise disparate computing architectures. For example SOP 140 may reside on a UNIX operating system while the provisioning server 120 may reside on a Windows server. In order for the two systems to process requests between them and effectively share data, the provisioning middleware 130 must receive, process and/or configure the data according to the requirements of the receiving system.

A firewall 115, as used herein, may comprise any hardware and/or software suitably configured to protect provisioning system 110 resources from users from other networks. Firewall 115 may reside in varying configurations including Stateful Inspection, Proxy based and Packet Filtering among others. Firewall 115 may be integrated as software within provisioning server 120, any other system components or may reside within another computing device or may take the form of a standalone hardware component.

Carrier system 135, as used herein, may include any individual, business, entity, software and/or hardware that facilitate communications. The carrier system 135 may receive commands, data, and requests for data from the provisioning system 110. The carrier system 135 may also transmit commands, data, and requests for data to the provisioning system 110. The carrier system 135 may operate in any number of configurations and contain any number of software components, hardware components, network facilities, etc. Components and/or entities comprising a carrier system 125 are known in the art. Further, it should be noted that any embodiments of carrier systems are illustrated and described herein for the purpose understanding the invention and should not limit the scope of the invention.

SOP 140 may include any hardware and/or software suitably configured to store and provide customer information to facilitate a customer request or transaction. SOP 140 is known in the art and may encompass any number of hardware and/or software components and databases which interact with any number of other systems and databases within the Facility Administration Control System (FACS) 145. SOP 140 may employ databases to maintain address data, credit file data, lists of updated telephone numbers, etc. SOP 140 may also provide a carrier customer service representative with a centralized interface to the various carrier systems within FACS 145. Practitioners will appreciate that the functions of SOP 140 as described herein may be implemented through any number of commercially available systems, custom configurations of hardware and/or software, or a combination thereof, and does not in any way restrict or limit the scope of the invention.

FACS 145 may include any hardware and/or software suitably configured to facilitate the operations of a carrier. FACS 145 is described herein as a group of systems which work as a substantially unified system to facilitate management of a telephone and/or data network. As used herein, FACS 145 is used to describe all or most system components, being either standalone, integrated or a combination of both, which comprise the core of a telephone and/or data network. Practitioners will appreciate that the functions of FACS 145 as described herein may be implemented through any number of commercially available systems, custom configurations of hardware and/or software, or a combination thereof, and does not in any way restrict or limit the scope of the invention.

Credit system 150 may include any hardware and/or software suitably configured to receive and store customer and/or business credit data as well as provide credit data to subscribers. Businesses, entities and government organizations who maintain databases containing information pertaining to an individual's or business' credit worthiness are known in the art. Credit systems 150 include, for example, Experian™, Equifax™ and TransUnion™. The credit system 150 may be connected via a secure network with the carrier system 135 and may receive requests for data from any of the carrier system 135 components. Practitioners will appreciate that credit information may be processed by any number of methods, and computing logic used in that process may reside within any system component, whether within a carrier system 135 or a provisioning system 110.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, carrier data; financial institution data; and/or like data useful in the operation of the present invention. As those skilled in the art will appreciate, customer computer may include an operating system (e.g., Windows NT, 95/98/1000, OS2, UNIX, Linux, Solaris, MVS, MacOS, etc.) as well as various conventional support software and drivers typically associated with computers. Customer computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STAN- DARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (1002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, NY), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, carrier, issuer, user or the like. Furthermore, the security information may restrict/permit only certain actions such as accessing, modifying, and/or deleting data sets. In one example, the data set annotation indicates that only the data set owner or the user are permitted to delete a data set, various identified carriers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, javaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (1003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like.

Each customer is equipped with a computing device in order to interact with the system and facilitate online provisioning of services. The customer has a computing unit in the form of a personal computer, although other types of computing units may be used including laptops, notebooks, hand held computers, set-top boxes, cellular telephones, touch-tone telephones and the like.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions Referring now to FIGS. 2-4, the process flows depicted are merely embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2-4, but also to the various system components as described above with reference to FIG. 1. Further, illustrations of the process flows and the descriptions thereof make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages but have been combined for simplicity.

Practitioners will also appreciate that there are a number of methods for displaying data within a browser based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

Figure 2:
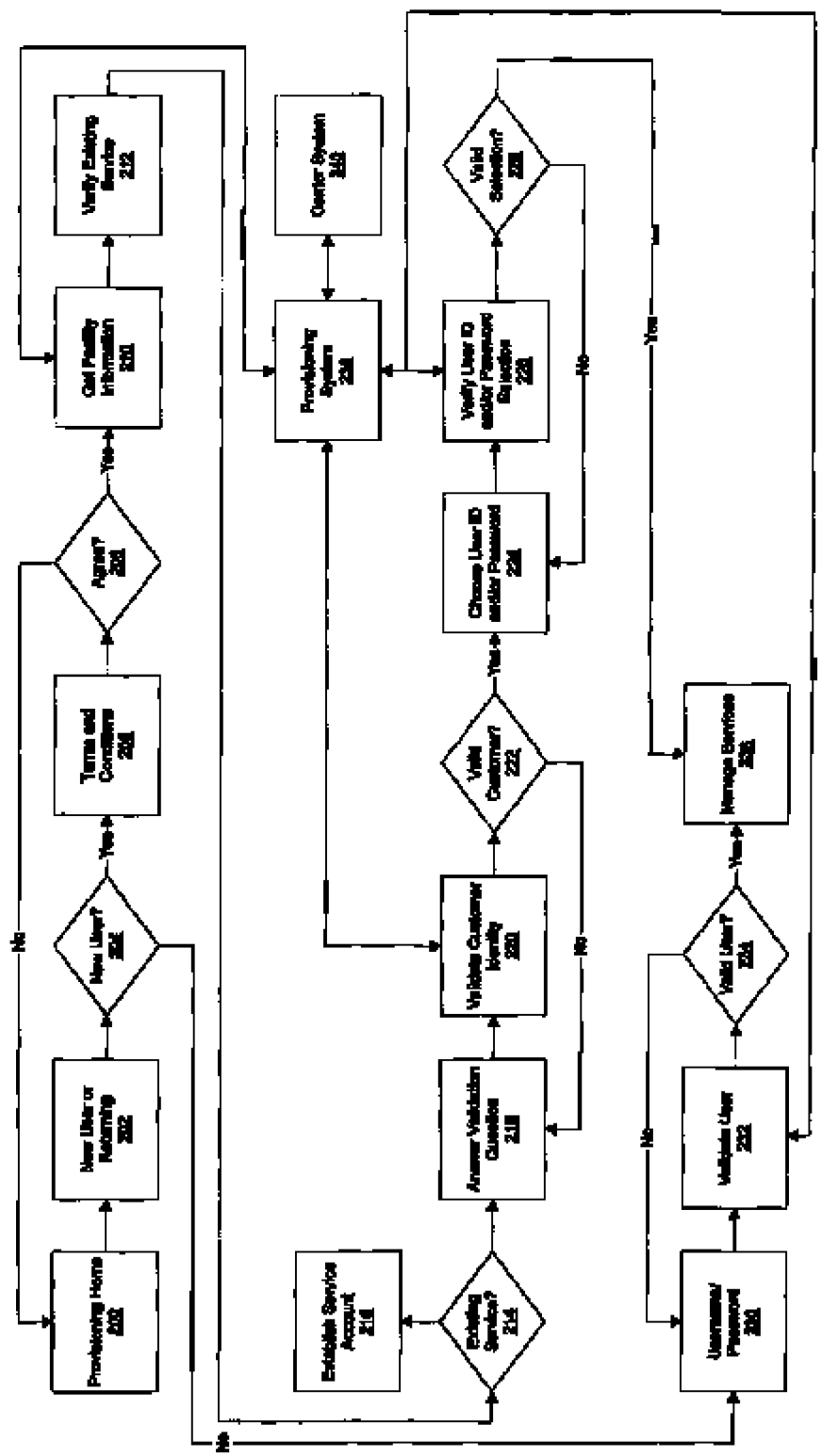
FIG. 2 is a flow chart illustrating an exemplary method for a customer of a telecommunications services supplier to create an account on the provisioning system.
Figure 3:
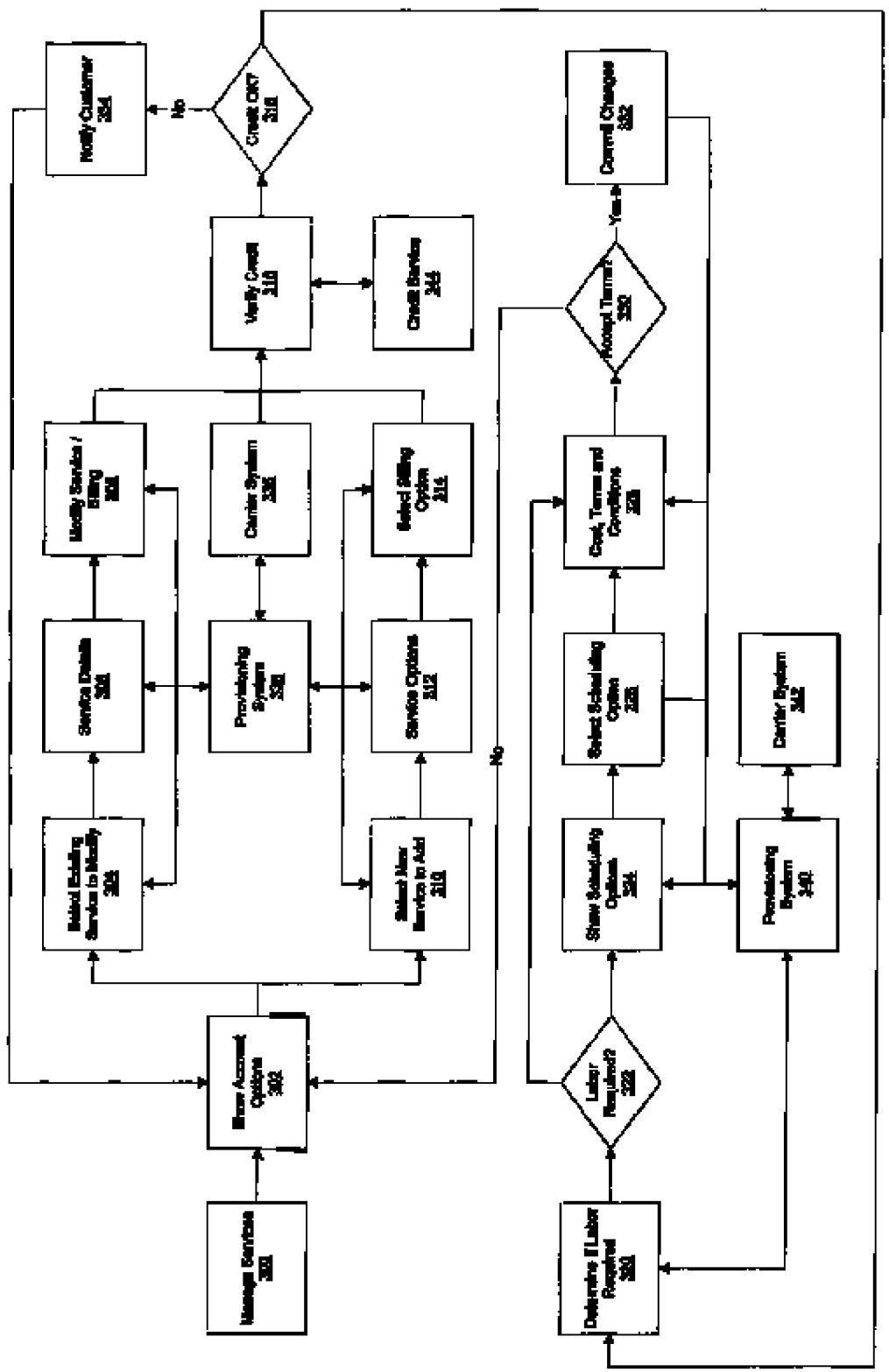
FIG. 3 is a flow chart illustrating an exemplary method for a customer to employ a provisioning system to add or modify telecommunications services; and, FIG. 4 is a flow chart illustrating an exemplary method for a new customer to employ the provisioning system to establish basic telephony service with a telephony service.
Figure 4:
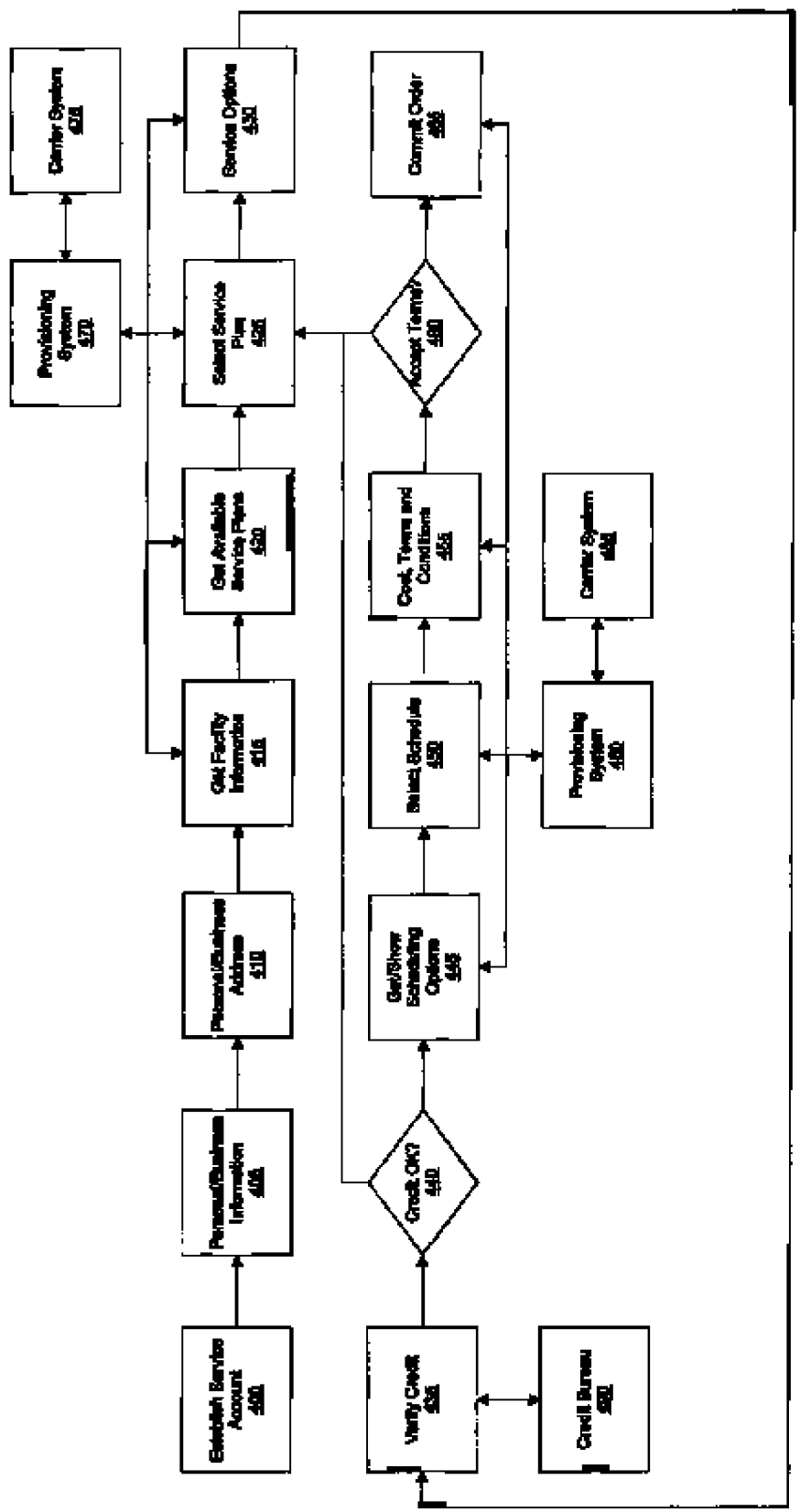

In the descriptions for FIGS. 2-4, common reference is made to the process steps of transacting data transmissions between provisioning system 110 and carrier system 135. The process steps, whether for transmitting a query, a command, or data to a component within the carrier system 135, may be very similar with only minor variances between them. However, a practitioner will appreciate that the steps as described below may be accomplished through any number of process steps and methods producing similar results. As used herein, "transmit" may include sending electronic data from one system component to another over a network connection. Additionally, as used herein, "data" may include encompassing information such as commands, queries, files, data for storage, and the like in digital or any other form.

A transmission of data to or from a carrier system 135 may originate from customer browser 105, provisioning server 120, or any other system or component of the invention. Transmitted data may be processed, formatted, and/or configured by provisioning middleware 130 in order to be suitably received by SOP 140. Data may then be transmitted from provisioning middleware 130 to SOP 140. It may be presumed that such data may be received by SOP 140 however data may also be received directly or indirectly by any of the carrier system 135 components. SOP 140 may use transmitted data to perform a transaction in the form of a query, execute a command, or store data in a database within one or more of the carrier system 135 components. Data resulting from the transaction may be transmitted from SOP 140 to provisioning middleware 130 wherein provisioning middleware 130 may process, format and/or configure the data in order to be received by provisioning server 120. Provisioning server 120 may further process the data, transmit the data to a customer browser 105 and/or store the data in a provisioning database.

FIG. 2 illustrates exemplary steps to enable a customer 100 of a carrier service 135 to facilitate management of carrier services through a provisioning system 110. A customer 100 of a carrier may access a homepage (step 200) for a provisioning system 110 through a browser 105 that is in network communication with a provisioning system 110. The webpage may be operated by provisioning system, by a carrier which incorporated the provisioning system into its own system or any other third party which provides the data to provisioning system 110. A provisioning website may include a provisioning system 110 determining if customer 100 is a new user or a returning user (step 202) which may be accomplished through any method known in the art, for example, by the use of cookies, or direct user input. For example, a customer 100 may be presented with a temporary account setup webpage, which prompts the customer 100 to input information concerning the customer's 100 status as either a new or returning user.

If provisioning server 110 determines that a customer 100 is a returning user (step 204), then the customer may be presented a webpage and prompted to enter a user ID and/or password (step 230). User ID and/or password entry may be validated (step 232) by transmitting the entry to a provisioning system and/or carrier system (step 238). The provisioning server 120 may query a provisioning database 125 using the user ID and/or password entry. If the entry is found in a provisioning database 125 then a provisioning system may verify that customer 100 is valid (step 234) and presents customer 100 with a webpage where the customer may facilitate the management of their carrier services (step 236).

If a provisioning server 120 determines that a customer 100 is a new user (step 204), then the customer may be presented a webpage and prompted to read terms and conditions (step 206). Terms and conditions may apply to any customer 100 who is registered with a provisioning system 110 and may include, for example, disclosure of user fees, legal disclaimers, privacy information, rules for participation, fraudulent use warnings, and the like. A customer 100 may be prompted to indicate whether or not the customer agrees to the terms and conditions (step 206). This may be accomplished through any method known in the art, for example, by selecting a webpage hyperlink that is labeled with either "Agree" or "Don't Agree", or by providing a text box where user must type the word "Agree". If a customer 100 does not agree with terms and conditions (step 208) then the customer may again be presented with a provisioning home webpage (step 200). If customer 100 agrees with the terms and conditions (step 208), then the customer may be presented a facility information webpage (step 210) and prompted to enter facility address information.

Facility address information may be used by provisioning system 110 to obtain from a carrier system 135, information specific to the service and may comprise, for example, street address, city, state, zip code, dwelling type, and the like. Facility address information may be used to determine if a facility has existing carrier service (step 212). Facility address information in the form of a query may be transmitted from a provisioning system (step 238) to a carrier system (step 240). If, based on results from carrier system 135, provisioning server 120 determines that service does not exist (step 214) then customer may be presented with a webpage or link to carrier system 135 to initiate an order to establish a service account (step 216). This will be described in greater detail below in a discussion of FIG. 4.

In order to verify customer's 100 identity, customer 100 may be presented a webpage and prompted to answer a validation question (step 218) specific to a carrier account. The question may be based upon data that was queried from a carrier system 135 and may include, for example, a password or code defined by customer 100 when a carrier account was initially set-up, social security number, birth date, mother's maiden name, etc. To validate the customer's identity (step 220), a response to a validation question may be transmitted to provisioning system (step 238) where it may be compared to data returned from carrier system (step 240). If a customer's 100 response to a validation question is not accurate (step 222), a webpage may be presented prompting user to re-answer a validation question or answer a different validation question (step 218). A practitioner will appreciate that there are a number of methods known in the art for validating identification and that any number of validation methods may be applied to the invention.

A validated customer 100 may be presented a webpage and prompted to enter a user ID and/or password selection (step 224). A user ID and/or password selection may be verified (step 226) by transmitting the selection to a provisioning system (step 228). A provisioning server 120 may check to ensure a selection is in a proper format and may query a provisioning database 125 to ensure that the selection does not already exist. If provisioning server 120 determines that a selection is not valid (step 228) then a webpage may again be presented prompting customer 100 to select a different user ID and/or password (step 224). If the selection is determined to be valid, (step 228) then customers 100 may be presented a webpage where the customer may facilitate the management of their carrier services (step 236).

For simplicity, in FIGS. 3 and 4, two occurrences of a provisioning system and two occurrences of a carrier system are shown. It should be understood that these systems may be the same systems. Referring to FIG. 3, for example, provisioning system is twice illustrated as provisioning system (step 336) and again as provisioning system (step 340); yet, both occurrences of provisioning server may comprise a single provisioning server.

FIG. 3 depicts the exemplary steps that customers 100 may employ to modify their carrier services and/or order new service(s). Customers 100 may be presented a manage account webpage (step 300) from which to select an account to modify. In an embodiment of the invention, a customer 100 may be associated with one or more carriers and/or one or more service accounts with a single carrier. Customers 100 may select which carrier and/or account the customer would like to manage. After selecting an account, customers 100 may be presented a webpage showing account options (step 302) which may include the options of selecting an existing service to modify (step 304) and selecting a new service to add (step 310).

If a customer 100 chooses to modify an existing service, the customer may be presented a webpage to select from a list of services a service to modify (step 304). A list of available services based on customer's 100 account may be obtained by transmitting a query from a provisioning system (step 336) to a carrier system (step 338). When a service is selected, customer 100 may be presented a webpage showing more specific service details (step 306) including features that may be removed, modified, configured or upgraded. In order to obtain service details and to determine which details may be modified, a query may be transmitted from provisioning system (step 336) to a carrier system (step 338). For example, a customer 100 who previously purchased distinctive ring service, may modify a ring-tone or redefine rules regarding under what circumstances distinctive ring tones are used. Also, a customer 100 may select a service to suitably block telemarketing calls through known in the art or subsequently developed services. In this regard, the customer may not need to include the customer's information on the FCC's "Do Not Call" list (which may change due to changing legislation) or this service may supplement the FCC "Do Not Call" list.

In another example of a configurable service option, a customer 100 may choose to configure timeframes when basic service is disabled or partially disabled (e.g., allow 911 use or other emergency telephone numbers). This may be of value to customers 100 with service to an address which is not occupied at certain times. A customer 100, for example, who is regularly out of their home between the hours of 7:30 A.M. and 6:00 P.M., may choose to have service automatically disabled during that time. This may be particularly valuable to customers 100 susceptible to fraudulent, illegal or unauthorized use of their telephone services. A customer 100 may also be provided an option to disable and enable service at any time from any computer with access to the Internet. A customer 100 traveling overseas may login to a provisioning system and disable her telephone service. Just before she returns home, she may once again login to a provisioning system and enable her service.

After the system modifies a service, a customer 100 may be presented a webpage showing updated billing information (step 308) for the service. Billing information may be obtained by transmitting data regarding modified service details from a provisioning system (step 336) to a carrier system (step 338). Customer 100 may view any billing changes based on the service modification(s) as returned from a carrier system 135.

A customer 100 may also choose to add a new service to their service account. For example, an existing customer 100 with basic telephone service may choose to add a call-waiting feature to their service account. In order to add a new service, customer 100 may choose an option from a show account details webpage (step 302) which corresponds with customer's 100 desire to add new service to an existing service account. Customer 100 may be presented a webpage to select from a list of services to add (step 310). A list of available services may be obtained by transmitting a query from a provisioning system (step 336) to a carrier system (step 338). When an account with a carrier for basic telephony service is first established, a wire center is assigned based on the customer's 100 facility location. Services available to customer's 100 assigned different wire centers can vary, therefore carrier system 135 may use address information stored in one or more of its systems' databases to 1) identify the wire center, and 2) determine which services are available for that wire center.

Following customers' 100 selection of one or more services to add to their service account (step 310), the customer may be presented a webpage showing any service options (step 312) which may be available for selected service(s). For example, if a customer 100 selected to add long distance service to an existing telephony service, there may be several configurations of long distance calling plans available and the prices may vary accordingly. In another example, a customer 100 may be provided an option to restrict inbound and/or outbound service to a configurable geographic region or area codes. This may be configured to be in effect temporarily or effective over scheduled timeframes and may incorporate known caller ID functionality.

Service options which may have been defined within a carrier system 135 may be obtained by transmitting a query from a provisioning service (step 336) to a carrier service (step 338). Data regarding service options as obtained from a carrier system 135 may then be viewed by customer 100 who may then modify services based on available service options.

In another embodiment, a service options webpage (step 312) may also alert a customer to special promotions or package deals relating to selected service(s). For example, if a customer selects to add caller ID and call waiting services to an existing calling plan, the telephony servicing company may want to make the customer aware of a calling package which includes caller ID, call waiting and voice messaging. The cost for the package may be only slightly more than the combined cost of the individual services that were selected by the customer which might make the package more appealing. The carrier may also notify the customer via any communication device or method discussed herein (e.g., email or pager) of new offers or offer packages, of changes to an account, to request approval of changes from the customer or a third party (e.g., parent) and/or the like.

In still another embodiment, historic information residing within a carrier system 135 may be used to customize service offerings according to customer's 100 calling history, prior purchases, credit worthiness, and the like. For example, information from a billing system may show that a customer 100 makes frequent telephone calls to London. Such information may be used to present a customer 100 with special offers and/or calling plans tailored toward customers who make frequent calls to Europe. Further, provisioning system 110 may present customers 100 with data showing how much the customer spent over a period of time on calls to London along with a calculated estimate of how much the customer would save under a different long distance plan.

When customers 100 finish viewing and/or modifying service options (step 312), customers may be presented a webpage to view billing information along with any billing options available for the selected service(s) (step 314). Like service options, as described above, billing options may be defined within a carrier system 135 where the customer may be obtained by transmitting information regarding the selected services from a provisioning system (step 336) to a carrier system (step 338). Data regarding billing options as obtained from a carrier system 135 may then be viewed by customer 100 who may then modify billing options based on available service selection(s).

A practitioner will appreciate that while obtaining data from a carrier system 135 may be carried out through the steps as described above, there are a number of methods known in the art which may be employed in a web based architecture as described. For example, querying a carrier system 135 to obtain service options (step 312) and billing options (step 314) for one or more selected services, may be executed in a single transaction between customer browser 105 and carrier system 135, rather than the two transactions as described above. For simplicity, the exemplary transactional steps have been broken down into transactions corresponding with each process step.

Prior to storing customer's 100 modifications to an existing service or addition of one or more new services, a carrier may choose to verify customer's 100 credit (step 316) to ensure customer 100 will be able or likely to pay for modified and/or added services. Methods used to verify a customer's 100 credit are known in the art, therefore will not be discussed in great detail. However, it should be noted that while an outside credit reporting service (step 344) may be employed to perform customer credit verification, related information may also be obtained internally from within a carrier system 135. For example, databases within a carrier system 135 may contain payment history connected to an existing customer 100, therefore a provisioning system 110 may use customer's 100 payment history in determining whether to allow a transaction to proceed.

If a provisioning system 110 determines that a customer's 100 credit is not sufficient for modified or added service(s) (step 318), then customer 100 may be notified (step 334) of the deficiency via a webpage or email message. Customer 100 may then be presented with a show account options (step 302) webpage where they may select a different account option or exit from the provisioning system.

If a provisioning system 110 determines that a customer's 100 credit is sufficient for modified or added service(s) (step 318), then the nature of the service(s) may be defined in order to determine whether human labor or testing is required (step 320). In order to determine whether service(s) may require human labor or testing, modified and/or added service data may be transmitted from a provisioning system (step 340) to a carrier system (step 342). Data returned from carrier system 135 may indicate whether of not human labor and/or testing may be required. If it is determined that human labor and/or testing may be required (step 322), then service(s) may require scheduling and customer 100 may be presented a webpage to view a schedule for completion of work and any options which may be available (step 324). For example, if a customer 100 added a second line to their existing service, then work and testing will likely be required at the customer's 100 facility. This may require the customer 100 to be present while service is being performed. Regardless to whether or not a customer 100 would need to be present during service, a number of other issues which may effect scheduling may be incorporated into the scheduling system such as, for example, work force availability, availability of special equipment and/or supplies, other work in or around customer's facility, and the like.

To determine an approximate start and completion date for a service requiring human labor and/or testing, modified and/or added service data may be transmitted from a provisioning system (step 340) to a carrier system (step 342). Carrier system 135 may determine, 1) an earliest date/time that work may begin, 2) an earliest estimate of when work may be complete and 3) whether work will require entry into a secured area. Based on scheduling data returned from carrier system 135, scheduling may require customer 100 to choose a convenient date/time for work at a customer 100 facility. The date/time selection may be in the form of a group of date/time options from which customer 100 may select a date/time the best suits customer's 100 schedule. If this is the case, customer 100 may select a date/time for work to commence (step 326).

Prior to transmitting service data to a carrier system 135 for processing, customer 100 may be presented a webpage displaying a summary of services ordered and/or modified, costs, scheduling confirmation, and any legal terms and conditions attached to services (step 328). Customer 100 may review service modifications and/or additions to ensure accuracy in scheduling, service orders and costs. A cost, terms, and conditions webpage (step 328) may also contain other information as needed such as, for example, terms of use, payment obligations, installation terms, and other information which may be contractual in nature. If customer 100 reviews cost, terms and conditions (step 328) and either finds inaccuracies or does not otherwise agree to proceed with a transaction, customer 100 may choose to not accept a terms (step 330). If this is the case, customer 100 may again be presented with a show account options webpage (step 302) in order to repeat the steps and correct any inaccuracies or exit from the provisioning system 110.

If customer 100 accepts the cost, terms and conditions (step 330) and chooses to proceed, the service data may be committed (step 332) by transmitted from a provisioning system (step 340) to a carrier system (step 342) where information regarding services, modifications, scheduling data, billing data, etc., may be routed to various systems throughout a carrier system 135. Appropriate carrier system 135 components may generate and issue work orders, while orders not requiring human labor or testing may be routed to appropriate switching systems. Billing data may be routed to appropriate carrier system 135 components such as, for example, accounting systems, marketing systems, inventory systems, loyalty systems, and the like. Because some services may be activated through software interfaces and may not require hardware configuration, it may be possible for a service to be activated upon processing. For example, if a customer selected to add voicemail service to their existing telephony service, then it may be possible for the service to be activated as soon as it is processed within a carrier system 135.

When service and/or modification data has been processed and/or stored, a confirmation number may be generated by a carrier system 135. While not illustrated in FIG. 3, provisioning system 110 may create a recap of a transaction which may include, for example, customer name, description of service(s) ordered, description of service(s) modified, description of modification(s), cost information, billing information, scheduling information, confirmation number, loyalty point information, and the like. Recap data may be presented to customer 100 via email and/or within a webpage which a customer 100 may save and/or print.

Referring back to FIG. 2, a person and/or business who is not currently a customer of a carrier may initiate an order for basic service (e.g., telephony service). If during a provisioning system 110 account registration process it is established that user does not have an existing service account with carrier (step 214), user may be presented a webpage from which user may initiate establishment of a service account (step 216).

Referring now to FIG. 4, from an establish service account webpage (step 400), a customer 100 may choose to proceed with an ordering process. While provisioning system and carrier system may appear twice in FIG. 4, one skilled in the art will appreciate that this repetition is merely for simplicity. However, one or more provisioning system and carrier system may exist in the system. Customer 100 may be presented a webpage and prompted to enter personal information (step 405) (if customer 100 is establishing service for an individual), or business information (if customer 100 is establishing service for a business). Personal and/or business information may include, for example, name, social security number, tax ID number, birth date, email address, and the like. When customer 100 has finished entering personal and/or business information (step 405), information may be transmitted to a provisioning server (step 470) where it may be stored within a provisioning database 125. Customer may also be prompted to establish an account directly with the carrier before establishing an account with the provisioning service.

Customer 100 may then be presented a webpage and prompted to enter personal and/or business address (step 410). Customer 100 may be required to enter two addresses if a service address and billing address are not the same. When customer 100 has completed entering address information (step 410), information may be transmitted to a provisioning system (step 470) and stored within a provisioning database 125. Address data may be used by a carrier system 135 to determine what services may be available and whether existing service currently exists for the provided address. Data returned from a carrier system 135 in response to an address query may include 1) service plans which are available based the wire center for the address, and 2) whether or not service exists for the address.

When a listing of available service plans (step 415) has been obtained from a carrier system 135, customer 100 may be presented a webpage listing available service plans (step 420) for the user's address. Service plans may be presented as individual services or as service packages. For example, a service plan may consist of simple telephone service or may consist of telephone service, call-waiting, caller ID and call forwarding. When a customer 100 selects a service plan (step 425), the customer 100 may be presented with any service options (step 430) that may be available for the selected plan. Selected service options (step 430) may induce additional fees in excess of that of the selected service plan.

After a customer 100 has selected a service plan and service options, a carrier system 135 may verify a customer's 100 credit rating (step 435) to ensure user will be able or likely to pay for a selected service. If customer's 100 credit meets criteria as defined within a carrier system 135 (step 440), then a request may be transmitted to a provisioning system (step 480) in order to obtain and show scheduling options (step 445) for the selected service plan and options. A customer 100 may be prompted to select one or more schedule options (step 450). If service exists for customer's 100 address as determined above, scheduling may not be necessary and telephone service could be provided at any time from when the order is committed. If customer's credit does not meet criteria as defined within a carrier system 135 (step 440), then customer 100 may be presented a webpage whereby the customer may select a different service plan (step 425) that the customer may qualify for.

If it is determined that service does not exist for an address as provided by a customer 100 (step 420), then service installation may need to be scheduled and customer 100 may be presented a webpage to view a schedule for completion of work and any options which may be available (step 450). Scheduling for installation of new service may be necessary for several reasons. Installation of new service to an address facility with no existing service may require that service personnel have physical access to the facility. This may require a customer 100 to be present while service is being performed. A number of other issues may also effect scheduling such as, for example, work force availability, availability of special equipment or supplies, other work in or around customer's facility, and the like.

To determine an approximate start and completion date for a service requiring human labor and/or testing, service data may be transmitted from a provisioning system (step 480) to a carrier system (step 485). Carrier system 135 may determine, 1) an earliest date/time that work may begin, 2) an earliest estimate of when work may be complete and 3) whether work will require entry into a secured area. Based on scheduling data returned from carrier system 135, scheduling may require customer 100 to choose a convenient date/time for work at a customer 100 facility. The date/time selection may be in the form of a group of scheduling options from which customer 100 may select a date/time the best suits customer's 100 schedule. If this is the case, customer 100 may select a date/time for work to commence (step 450).

Prior to transmitting service data to a carrier system 135 for processing, customer 100 may be presented with a webpage displaying a summary of the service plan ordered, scheduling confirmation, and any legal terms and conditions attached to service (step 455). Customer 100 may review this information to ensure accuracy in scheduling, service plan and cost. A cost, terms, and conditions webpage (step 455) may also contain other information as needed such as, for example, terms of use, payment obligations, installation terms, and other information which may be contractual in nature. If customer 100 reviews cost, terms and conditions (step 455) and either finds inaccuracies or does not otherwise agree to proceed with a transaction, customer 100 may choose not accept a terms (step 460). If this is the case, customer 100 may again be presented with a select service plan webpage (step 425) in order to repeat the steps and correct any deficiencies or exit the system.

If customer 100 accepts the cost, terms and conditions (step 460) and chooses to proceed, the order may be committed (step 465) by transmitting order data from a provisioning system (step 480) to a carrier system (step 485) where data such as services, modifications, scheduling data, billing data, etc. may be routed to various systems throughout a carrier system. Appropriate carrier system 135 components may generate and issue work orders, while orders not requiring human labor or testing may be routed to appropriate switching systems. Billing data may be routed to appropriate carrier system 135 components such as, for example, accounting systems, marketing systems, inventory systems, and the like. If service exists for the facility address and does not require hardware installation, configuration and/or testing, it may be possible to activate service through software interfaces upon processing.

When order data has been stored, a confirmation number may be generated by a carrier system 135. While not illustrated in FIG. 4, provisioning server may create a recap of an order which may include, for example, customer name, description of service plan and service options, cost information, billing information, scheduling information, confirmation number, and the like. Recap data may be presented to customer 100 via email and/or within a webpage which a customer may save and/or print.

An embodiment of the invention, while not illustrated, may include a webpage or webpages which allow a provisioning system 110 user to view status information for previous orders. A customer 100 may be prompted to enter a confirmation number to use to query carrier system 135 for status information. Also, provisioning database 125 may store an order for reference whereby, when a customer 100 logs into a provisioning system 110, a provisioning database 125 may be queried for any pending orders. Provisioning server 120 may then use order data to send a query to carrier system 135 in order to retrieve order status to present to customer 100.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method, comprising:
   receiving, by a computer based system for managing telecommunication services having a processor and a non-transitory memory, account information via a webpage;
   receiving, by the computer based system, a request to modify a communications service of an account including at least one of a request to add a service to an account, a request to modify an existing service to the account and a request to remove a service from the account;
   verifying, by the computer based system, that the request to modify the communications service conforms with pre-determined requirements of the account and a carrier system, wherein the verifying comprises determining an authorization level of the account owner;
   testing, by the computer based system, the carrier system;
   determining, by the computer based system, at least one of human-labor-required and no-human-labor-required in response to the testing of the carrier system;
   presenting, by the computer based system, a service options webpage alerting of a promotion relating to the request, wherein the promotion is a reward which is offered to the account owner based on the request to modify a communications service;
   receiving, by the computer based system, at least one of an acceptance of the promotion and a denial of the promotion;
   presenting, by the computer based system, updated telecommunications services available with the account, in response to the request to modify a communications service of the account;
   presenting, by the computer based system, updated billing information based on the request;
   receiving, by the computer based system, an indication that the updated billing information and the updated telecommunications services are acceptable; and
   transmitting, by the computer based system, the request to a provisioning system
      wherein the provisioning system issues a work order in response to a determination of human-labor-required, and
      wherein the provisioning system routes the request to modify the communications service to a switching system in response to a determination of no-human-labor-required.

2. The method of claim 1, wherein the communication service includes at least one of: a cable service, a voice messaging service, a long distance service, a call forwarding service, a conference calling service, a distinctive ring service, a caller ID service, a call blocking service, and a bill payment service.

3. The method of claim 1, wherein the carrier system provides at least one of: telephony services and data services.

4. The method of claim 1, further comprising awarding loyalty points based upon the request.

5. The method of claim 1, further comprising determining, by the computer based system, whether the account owner has established an account with a provisioning system.

6. The method of claim 1, further comprising providing, by the computer based system, at least one of historical customer information related to the communication service and a suggested service.

7. The method of claim 1 further comprising scheduling, by the computer based system, an installation of the communications service in response to determining human-labor-required.

8. The method of claim 1, further comprising transmitting, by the computer based system, a summary of at least one of: costs, scheduling, and terms via the webpage.

9. The method of claim 1, wherein the transmitting occurs in substantially real-time in response to receipt of the indication that the updated billing information is acceptable.

10. The method of claim 7, wherein the scheduling comprises presenting user selectable times for installation.

11. The method of claim 1, wherein the account information is associated with at least one of a personal account and a business account.

12. The method of claim 1, further comprising presenting, by the computer based system, service plan options in response to the request, wherein the request includes adding a service plan.

13. The method of claim 1, further comprising implementing, by the computer based system, the request in substantially real time in response to determining no-human-labor-required.

14. The method of claim 1, further comprising determining, by the computer based system, an existing service in response to receiving the account information.

15. The method of claim 1, further comprising displaying, by the computer based system, a plurality of user selectable service plans in response to receiving the account information.

16. A non-transitory tangible computer-readable storage medium having computer-executable instructions stored thereon that, if executed by a computer based system for managing telecommunications services, cause the computer based system to perform a method comprising:

receiving, by the computer based system, account information via a webpage;

receiving, by the computer based system, a request to modify a communications service of an account including at least one of a request to add a service to an account, a request to modify an existing service to the account and a request to remove a service from the account;

verifying, by the computer based system, that the request to modify the communications service conforms with predetermined requirements of the account and a carrier system, wherein the verifying comprises determining an authorization level of the account owner;

testing, by the computer based system, the carrier system;

determining, by the computer based system, at least one of human-labor-required and no-human-labor-required in response to the testing of the carrier system;

presenting, by the computer based system, a service options webpage alerting of a promotion relating to the request, wherein the promotion is a reward which is offered to the account owner based on the request to modify a communications service;

receiving, by the computer based system, at least one of an acceptance of the promotion and a denial of the promotion;

presenting, by the computer based system, updated telecommunications services available with the account, in response to the request to modify a communications service of the account;

presenting, by the computer based system, updated billing information based on the request;

receiving, by the computer based system, an indication that the updated billing information and the updated telecommunications services are acceptable; and transmitting, by the computer based system, the request to a provisioning system wherein the provisioning system issues a work order in response to a determination of human-labor-required, and wherein the provisioning system routes the request to modify the communications service to a switching system in response to a determination of no-human-labor-required.

17. A system comprising:

a network interface communicating with a non-transitory memory;

the memory communicating with a processor; and the processor, when executing a computer program for managing telecommunication services, is configured to:

receive account information via a webpage;

receive a request to modify a communications service of an account including at least one of a request to add a service to an account, a request to modify an existing service to the account and a request to remove a service from the account;

verify that the request to modify the communications service conforms with predetermined requirements of the account and a carrier system, wherein an authorization level of an account owner is determined;

test the carrier system;

determine at least one of human-labor-required and no-human-labor-required in response to the testing of the carrier system;

present a service options webpage alerting of a promotion relating to the request, wherein the promotion is a reward which is offered to the account owner based on the request to modify a communications service;

receive at least one of an acceptance of the promotion and a denial of the promotion;

present updated telecommunications services available with the account, in response to the request to modify a communications service of the account;

present updated billing information based on the request;

receive an indication that the updated billing information and the updated telecommunications services are acceptable; and transmit the request to a provisioning system wherein the provisioning system issues a work order in response to a determination of human-labor-required, and wherein the provisioning system routes the request to modify the communications service to a switching system in response to a determination of no-human-labor-required.

18. The method of claim 1, wherein verifying further comprises determining a credit worthiness of an account owner in response to at least one of the request to add a service to the account.

19. The method of claim 18, wherein verifying further comprises determining at least one of the credit worthiness of the account owner in response to the request to modify the existing service from the account.

* * * * *